G. ENGELBREKT.
FUEL MACHINE.
APPLICATION FILED FEB. 15, 1918.
1,281,541.
Patented Oct. 15, 1918.
2 SHEETS—SHEET 1.
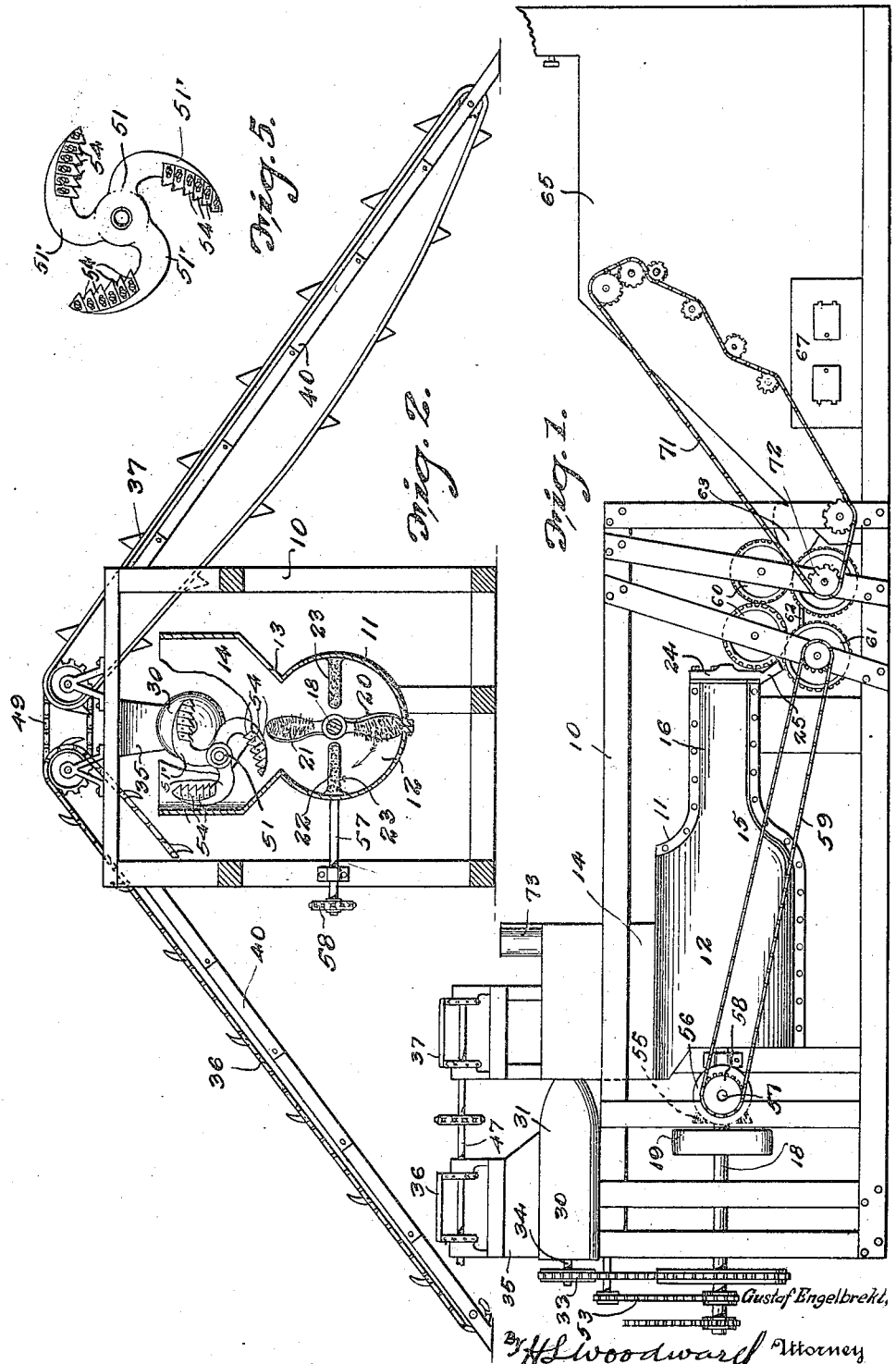

G. ENGELBREKT.
FUEL MACHINE.
APPLICATION FILED FEB. 15, 1918.
1,281,541.
Patented Oct. 15, 1918.
2 SHEETS—SHEET 2.
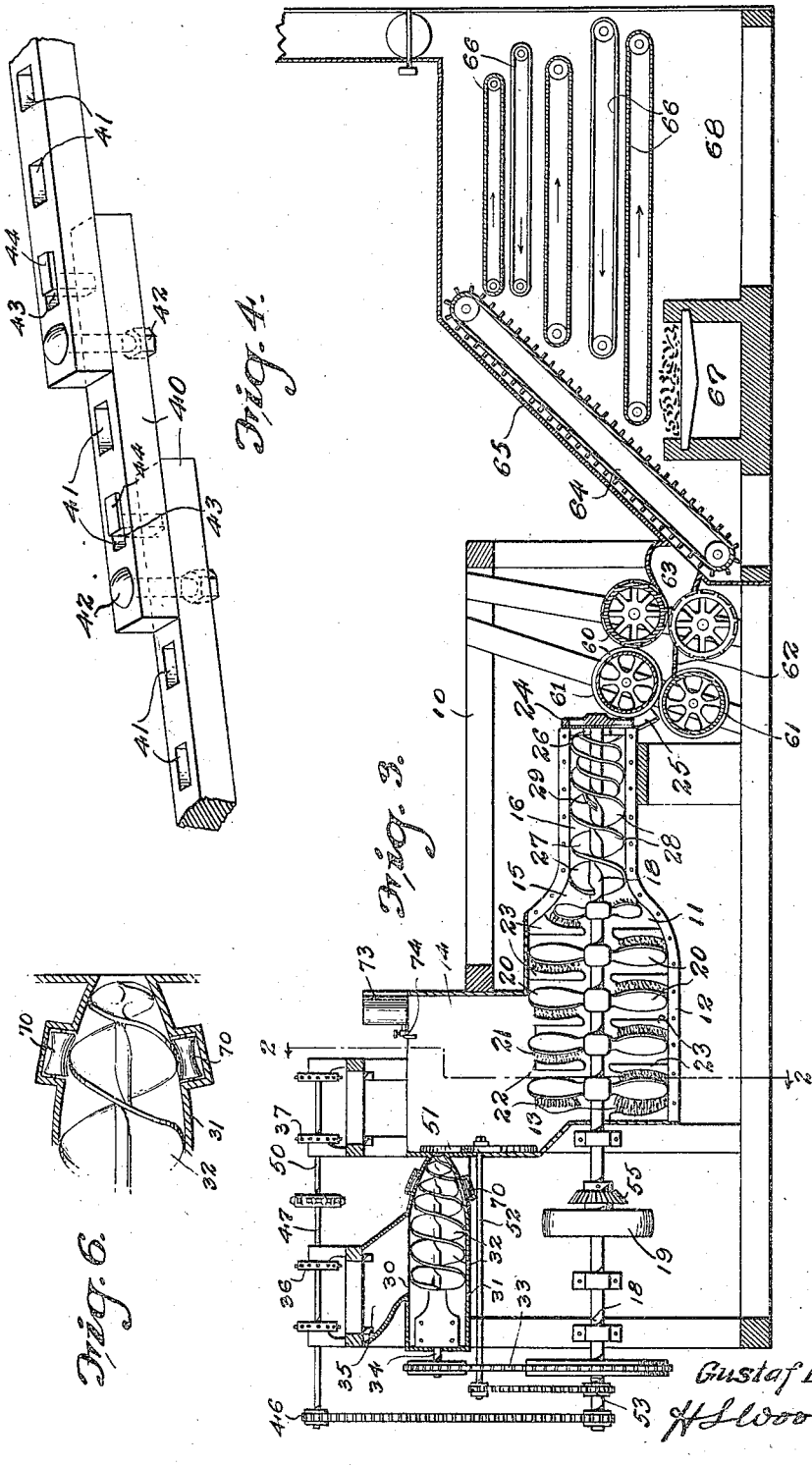
Inventor
Gustaf Engelbrekt,
H S Woodward
Attorney

UNITED STATES PATENT OFFICE.

GUSTAF ENGELBREKT, OF SUPERIOR, WISCONSIN.

FUEL-MACHINE.

1,281,541.  Specification of Letters Patent.  Patented Oct. 15, 1918.

Application filed February 15, 1918. Serial No. 217,347.

*To all whom it may concern:*

Be it known that I, GUSTAF ENGELBREKT, a citizen of the United States, residing at Superior, in the county of Douglas and State of Wisconsin, have invented certain new and useful Improvements in Fuel-Machines, of which the following is a specification.

The invention has for an object to present a machine for efficiently treating and mixing plastics and fibrous materials in one structure, and for molding the same rapidly and automatically. It is an important aim of the invention to give a means for satisfactorily handling a material such as straw in bulk, just as it would be found upon a stack, and reducing it to fine particles as it is delivered to a mixer where it is thoroughly worked into a plastic material, such as clay. It is also an important aim to present a satisfactory machine for working the clay down to a fine plastic mass and at the same time rapidly working the straw thereinto. It is an important aim to so construct this mixing and working mechanism that the mass being treated will at the same time be moved progressively toward a point of discharge. A further aim is to give an efficient means for forcibly compressing the mixed materials and ejecting them from the mixing device in a highly condensed form.

It is another consideration of the invention to give a means for rapidly molding the plastic material as delivered, and an efficient apparatus for drying the molded material rapidly and economically.

Additional features of invention, together with important advantages thereof will appear from the construction, arrangement, and combination of parts comprising one of the possible embodiments, as described hereinafter, and shown in the drawings, wherein, Figure 1 is a side elevation of an apparatus constructed in accordance with the invention, Fig. 2 is a cross sectional view thereof, Fig. 3 is a longitudinal sectional view thereof, Fig. 4 is a detail of the leg construction for the conveyers, Fig. 5 is a detail of the fiber cutter, Fig. 6 is an enlarged view of the end of the feed device.

There is illustrated a machine comprising a frame work 10 in which there is mounted a main mixing chamber 11, the chamber including an enlarged cylindrical portion 12, with a receiving opening 13 in its upper part forming the discharge aperture of a hopper 14 mounted thereover. The enlarged portion 12 comprises the mixing chamber proper, and is tapered toward its discharge end as at 15, and continued in reduced cylindrical form, as at 16. Mounted concentrically in the chamber and its extension there is a shaft 18, having the main drive pulley 19 mounted thereon, and this shaft has mounted thereon within the enlarged portion 12 of the mixing chamber a multiplicity of propeller arms 20, having the form of segments of a helicoidal screw with the proper pitch for the functions to be described, these arms being properly broadened and formed on one or both sides with projecting teeth or spines 21 adapted to pass closely between similar spines 22 on stationary blades 23 upon the walls of the enlarged portion 12 of the mixing chamber. The reduced portion 16 of the mixer chamber terminates in a cap piece 24, having a delivery spout 25 at its lower part adapted to deliver material expressed therethrough to rollers to be subsequently described. The shaft 18 is continued through this part of the chamber having a suitable bearing 26 immediately adjacent the cap 24. Upon the shaft 18 within the reduced part 16 a helicoidal screw element 27 is mounted, having two pallets 28, extending throughout its length, and two auxiliary pallets beginning intermediately of the pallets 28, and extending to the end of the chamber, serving to assist in highly compressing material moved outwardly in the chamber so that it may be readily discharged through the spout 25.

Supported by the frame 10 to one side of the hopper 14, there is a straw compressor and feeder device 30, including a casing 31 having a reduced discharge end opening through the side of the hopper 14, and having mounted therein a helicoidal feed screw 32. The screw 32 is driven by a chain 33, engaged on suitable sprockets on the shaft 18, and the shaft 34 of the screw 32. The chamber 31 is provided with a feed hopper 35 mounted over which there is the upper end of a straw conveyer 36, constructed in a suitable manner to lift straw and the like and discharge it into the hopper 35. Mounted over the hopper 14 there is also the upper end of a conveyer 37, suitable for lifting material such as clay and discharging it into the hopper 14. The conveyers 36 and 37 each include adjustable leg frame supports 40, at their lower parts, the upper end of the leg frames resting upon the frame work 10, while their lower ends, carrying suitable rollers for supporting the lower end of the conveyer rest upon the ground. The leg frames 40 are built up in sections, as shown in Fig. 4, each section having a multiplicity of short longitudinally spaced slots 41 therein, and having at one end a suitable opening for engagement of a clamping bolt 42 therethrough, while at the opposite end there is provided a locking arm 43, preferably formed of metal, and including a lug 44, projected longitudinally of the section and toward the adjacent end thereof the total dimensions of the lug and arm 42 being such that they may be readily inserted through the slots 41 of another section. The opening for the bolt 42 is so located with respect to the slots that when the arm 42 is engaged through one of the slots and the lug 44 forced beyond the end of the slot through which it is inserted, the bolt 42 may be engaged through one of the slots on the section carrying the arm 42. In this way the length of the supporting legs may be readily varied, either by removing the section, or by adjusting them in their overlapped relation. The conveyer 36 may be driven by a chain connection 46 including a sprocket on the shaft 18 and a sprocket on a shaft at the upper end of the conveyer. The conveyer 37 may be driven by a chain 49 engaged around two sprockets, one at the inner end of the shaft 47 and the other at the adjacent end of the shaft 50 at the upper end of the conveyer 37. These details being indicated clearly in Figs. 2 and 3.

Within the hopper 14, adjacent the discharge end of the device 30, a cutting knife 51 is mounted, having blade portions rotating closely before the discharge opening of the straw feeder device, mounted on a shaft 52, driven by a chain from the shaft 18 as at 53, in Figs. 1 and 3. The knife 51 includes arm elements 51' each in the form of a segment of a parabola at their outer parts, and upon the side adjacent the discharge opening of the straw feed device a multiplicity of blade elements 54 are provided, each having an individual diagonal cutting edge, the cutting edges of the blades being arranged to present the appearance of saw teeth, with the exception that the inclined cutting edges are presented in the direction of rotation of the knife. The arms 51 are so located with respect to the shaft 52 that a series of the blades 54 on each arm 52 will pass across the discharge opening of the straw feeder, each performing a draw cut function upon the material discharged before the knife. This style of cutter will scatter the small particles of straw thoroughly over the hopper 14 as the straw is cut, shortening materially the time required to attain the thorough admixture of the straw and plastic. The scattering action is assured both by the intermittent action of the cutter 70 and the fact that the straw is resilient and having been considerably compressed, its relief from compression coincidently with its severance from the confined body still in the device 30, will result in a pronounced scattering of particles, as will be understood.

Upon the shaft 18 in a suitable location, there is mounted a bevel gear 55, driving a gear 56 of a shaft 57 upon the outer end of which there is mounted a sprocket 58 by which a belt 59 is driven, this belt being utilized to supply power to a series of forming rollers 60 located in pairs closely adjacent the discharge end of the mixing chamber 11, one roller of each pair being located over the other, the first pair adjacent the mixer being located so that the material discharged through the spout 25 will be fed directly between the rollers, as clearly shown in Fig. 3. These first rollers are provided adjacent each end with bearing flanges 61 coengaged to hold the rollers in fixed spaced relation, while the intermediate portions of the rollers are of smaller diameter and of plain cylindrical form, whereby the material fed between the rollers will be rolled into a flat sheet and passed therefrom across a shelf 62 to a second pair of rollers which may be designated "forming rollers", and are provided with opposed teeth or recesses to give the plastic material passing across the shelf 62 the desired shape determined upon for the finished product. From these rollers the material passes into a hopper 63 by which it is fed to a conveyer 64 within a drying oven 65. The upper end of the conveyer 64 is arranged to discharge the contents upon the first of a series of horizontal conveyers 66, arranged to convey the formed material alternately in opposite directions, each conveyer having its receiving end projected slightly beyond the discharge end of the next conveyer above. Any suitable means as indicated diagrammatically at 67 may be employed for heating the oven. The oven is provided with an enlarged space 68 in which the finished material may be discharged for removal, which may be accomplished in any desired way.

The mounting of the screws 32 includes a plurality of rollers 70, carried upon suitable mountings at the tapered end of the casing 31 and exposed upon the interior of the casing through suitable slots formed in the casing, so that the screw 32 may rotate upon these rollers thereby obviating the necessity for a bearing at the extreme of the screw, before the discharge opening.

The conveyers 66 may be driven by a chain 71, engaged upon the sprockets 72 on the shaft of one of the outer rollers 60, and engaged tortuously between and around the rollers of the conveyers 64 and 66 in a suitable manner to give them movement in the desired direction. The rollers 60 of the first pair adjacent the mixing chamber have intermeshed gears, as have the outermost pair, the gears of the lower rollers being spaced apart, while the gears of the upper rollers are adjusted in intermeshed relation, thereby enabling a single connection with one of the rollers to drive the whole set.

Means is provided at 73 for feeding liquid chemical into the mixing chamber, as required, including a regulating cock 74.

What is claimed:

1. A machine for forming mixed fiber and plastic briquets comprising first and second receiving hoppers, means to deliver fiber to one, means to deliver plastic base to the other hopper, a feed chamber beneath the first hopper having a reduced discharge opening communicating with the second hopper, a stock compressing and feeding device in the chamber, an intermittent cutter disposed in the second hopper to act upon material extruded through said opening, whereby the material will be cut and scattered in the hopper, a mixing chamber disposed to receive from the second hopper, mixing and feed means therein including a coaxial shaft, one end of the chamber being reduced and having a concentric small cylindrical extension, said shaft being extended therethrough and having a helicoidal screw thereon for the purpose described, said extension having a discharge nozzle shaped to form extruded material into a flat ribbon, superposed shaping rollers arranged parallel to the major transverse medial plane of extruded stock to receive stock from the nozzle, a conveyer arranged to receive from the rollers, and a drying device coöperatively associated therewith.

2. A machine of the character described comprising a fiber receiving element, a plastic receiving element, said fiber mixing element having a reduced discharge arranged in the plastic mixing element, feed means in the fiber receiving element, a rotary saw toothed cutter knife in the plastic mixing element mounted closely over said discharge of the fiber receiving element.

In testimony whereof I have affixed my signature in presence of two witnesses.

GUSTAF ENGELBREKT.

Witnesses:
GUST. A. STENBERG,
GOETHE ENGELBREKT.